Figure 1:
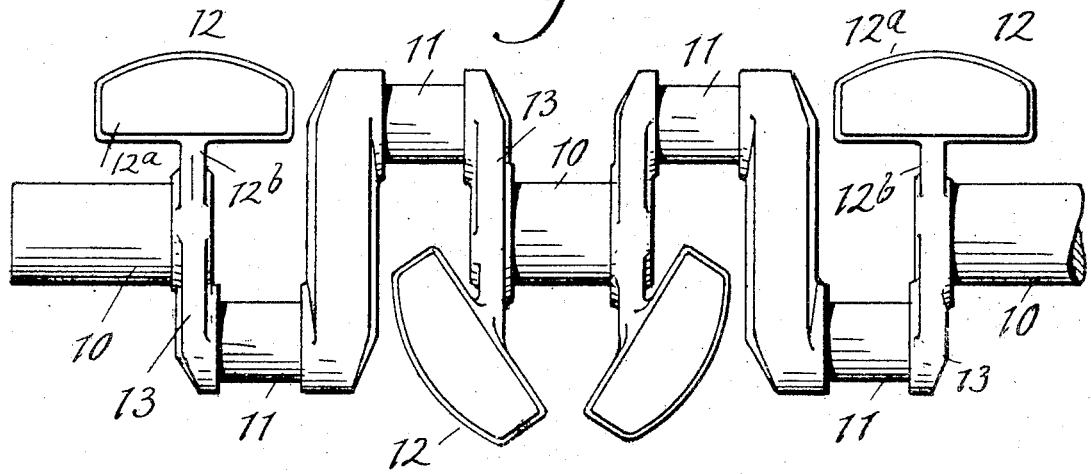

Dec. 11, 1923.  
L. W. GREVE  
1,476,812  
METHOD OF MAKING COUNTERBALANCED CRANK SHAFTS  
Filed Oct. 27, 1921

Inventor  
Louis W. Greve  
by Thurston Kwis & Hudson  
Attys.

Patented Dec. 11, 1923.

1,476,812

UNITED STATES PATENT OFFICE.

LOUIS W. GREVE, OF CLEVELAND, OHIO, ASSIGNOR TO THE CHAMPION MACHINE & FORGING COMPANY, OF CLEVELAND, OHIO, A CORPORATION OF OHIO.

METHOD OF MAKING COUNTERBALANCED CRANK SHAFTS.

Application filed October 27, 1921. Serial No. 510,934.

*To all whom it may concern:*

Be it known that I, LOUIS W. GREVE, a citizen of the United States, residing at Cleveland, in the county of Cuyahoga and State of Ohio, have invented a certain new and useful Improvement in Methods of Making Counterbalanced Crank Shafts, of which the following is a full, clear, and exact description.

This invention relates to a method of making counterbalanced crank shafts which are commonly employed on high speed engines, particularly internal combustion engines of various kinds of automotive vehicles.

It is customary at the present time to counterbalance the off-center weights of crank shafts by attaching thereto by welding or otherwise, sector-shaped counterweights. The crank shafts are first forged and the counterweights are subsequently attached thereto for the reason that the counterweights which are sector-shaped as heretofore stated, lie in planes at right angles to the axis of the crank shaft, and therefore would require forging dies having much deeper depressions than is permissible in forging practice, particularly when forging crank shafts.

As far as I am aware, no method has heretofore been devised whereby counterweighted crank shafts could be forged with the counterweights produced thereon in the forging operation, having in mind the limitations of cost and the required constructional shape or design of the crank shaft to be produced.

The principal object of the invention is to avoid the necessity of separately applying counterweights to a crank shaft after it has been forged, and to provide a method whereby a crank shaft with integral counterweights shaped and located as required to produce the best results, can be produced with the counterweights formed on the crank shaft in the forging operation.

In accordance with the present invention, the counterweight masses are forged integrally with the crank shaft but substantially within the confines of the upper and lower surfaces of the crank shaft when forged, and in a subsequent step the counterweight masses are re-positioned so that they will extend laterally or transversely of the crank shaft axis as required.

In the preferred embodiment of the invention herein illustrated, in the first main step of the method the counterweights are formed in the desired final shape, but with the enlarged arc or sector-shaped portions in substantially the plane of the crank shaft axis and in the next main step of the method these portions are turned or twisted so as to cause them to occupy their final and desired positions.

The invention may be further briefly summarized as consisting in certain novel steps of the improved method which will be described in the specification and set forth in the appended claims.

Figure 2:
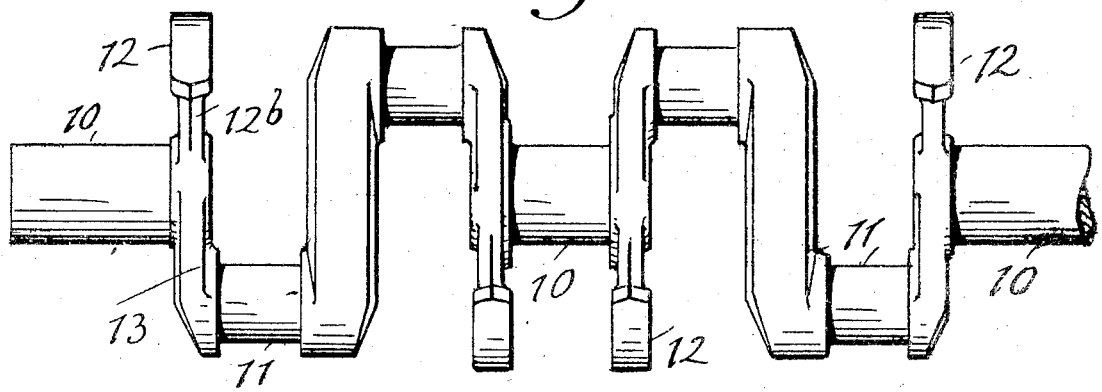
Figure 4:
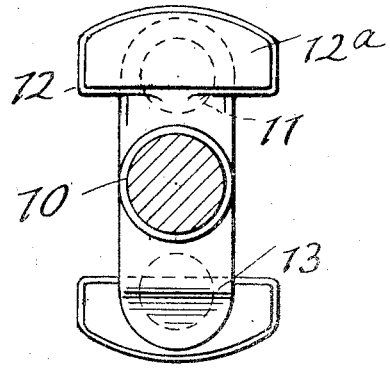
Figure 3:
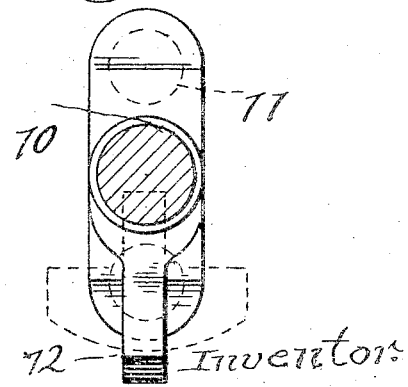

In the accompanying sheet of drawings showing the main steps of producing the crank shaft by my improved method, Fig. 1 is a side view of the crank shaft as produced in the forging dies; Fig. 2 is a similar view after the metal of the counterweight masses has been shifted so as to cause the counterweights to occupy their final positions, this being done in this instance by twisting or turning the counterweights; Fig. 3 is a transverse sectional view of Fig. 1; and Fig. 4 is a transverse sectional view of Fig. 2.

In the drawings I have shown a four-throw three-bearing crank shaft, but the invention may be utilized equally well with crank shafts having a different number of bearing portions and any desired number of throws or crank pins, the particular crank shaft herein illustrated being employed for convenience only.

In Fig. 1 I have shown a crank shaft as produced by the first main step of the method. This crank shaft has in this instance, (but as before explained, not necessarily) three bearing portions 10, four crank pins 11, and four counterweights 12, the counterweights being located in this instance opposite the cheeks or arms 13 between each bearing portion 10 and the adjacent crank pin 11, and on the opposite side of the axis of the crank shaft to that on which the associated cheeks or arms extend. It will be observed also that each counterweight comprises a sector-shaped portion 12ª and a neck portion 12ᵇ, by which the former is integrally attached to the body of the crank shaft. Likewise it will be noted by reference to Figs. 1 and 3, that the sector-shaped portions 12ª of the counterweights of the crank shaft when first formed or produced by the first main step of the method lie in the same plane which includes the axis of the crank shaft.

In a three-bearing crank shaft as herein illustrated, the middle cheek plates extending from the middle bearing portion 10 may be so close together as to prevent the sector-shaped portion of the middle counterweights to be forged at right angles to their neck portion, as is the case with the end counterweights, in which event the middle counterweights are preferably forged in tilted position with reference to their neck portions, as shown in Fig. 1.

In the next step of the method the crank shaft is completed except for such final machining as may be necessary, by twisting or bending the neck portions of the counterweights until the sector-shaped portions of the counterweights lie in planes at right angles to the axis of the crank shaft and directly in line with the cheek plates opposite them, as clearly shown in Fig. 2. This twisting or twisting and bending of the counterweights is, of course, done while the forged crank shaft is still hot, and if necessary or desired, may be accomplished after the crank shaft is re-heated.

Thus by this method there is produced a crank shaft wherein the counterweights are forged integral with the body of the crank shaft, and I am enabled to avoid the expensive operations of subsequently attaching the counterweights, and at the same time I produce a crank shaft wherein the off-center weights are as perfectly counterbalanced as possible, and wherein there is total absence of liability of the counterweights being thrown by centrifugal force from the crank shaft. At the same time by this method a crank shaft can be produced at a reasonably low cost.

I do not desire to be confined to the exact details shown, but aim in my claims to cover all modifications which do not involve a departure from the spirit and scope of my invention as defined in the appended claims.

Having described my invention, I claim:

1. The method of making a counterbalanced crank shaft which comprises forging a crank shaft having arms with integral counterweights having extended outer portions substantially parallel with the axis of the crank shaft and tilted at an angle with respect to each other, and turning the counterweights so that the extended outer portions are transverse to the axis of the counterweight and at right angles to the arms.

2. The method of making a counterbalanced crank shaft which comprises forging a crank shaft with arms having integral counterweights with enlarged portions lying within the confines of the upper and lower surfaces of the crank shaft when forged and with said enlarged portions tilted at acute angles with respect to the arms, and subsequently re-positioning said portions so that they lie in substantially parallel planes substantially transverse to the axis of the crank shaft with the enlarged portions thereof at right angles to the arms.

3. The method of making a counterbalanced crank shaft which comprises forging the crank shaft with arms which have integral counterweights thereon which are provided with arc or sector-shaped outer portions lying within the confines of the upper and lower surfaces of the crank shaft and tilted inwardly toward the axis of the crank shaft, and subsequently twisting the counterweights in two directions so as to cause said portions to lie in planes different than when forged and to straighten said outer portions with respect to the arms.

In testimony whereof, I hereunto affix my signature.

LOUIS W. GREVE.